US006831415B2

(12) United States Patent
Lee

(10) Patent No.: US 6,831,415 B2
(45) Date of Patent: Dec. 14, 2004

(54) CIRCUIT AND METHOD OF CONTROLLING VERTICAL AND HORIZONTAL SCREEN SIZES OF CATHODE RAY TUBE MONITOR

(75) Inventor: Jae-hun Lee, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/449,239

(22) Filed: May 30, 2003

(65) Prior Publication Data

US 2004/0000874 A1 Jan. 1, 2004

(30) Foreign Application Priority Data

Jun. 26, 2002 (KR) ........................................ 2002-36070

(51) Int. Cl.[7] .............................................. H01J 29/06
(52) U.S. Cl. ........................... 315/8; 315/367; 315/382; 348/806
(58) Field of Search ............................ 315/8, 364, 367, 315/370, 382, 382.1, 395; 348/184, 185, 806, 807

(56) References Cited

U.S. PATENT DOCUMENTS

| | | | | |
|---|---|---|---|---|
| 3,757,162 A | * | 9/1973 | Johnson ...................... 315/276 |
| 4,547,708 A | | 10/1985 | Haferl ......................... 315/371 |
| 4,683,405 A | * | 7/1987 | Truskalo et al. ........ 315/368.23 |
| 4,916,365 A | * | 4/1990 | Arai ............................ 315/383 |
| 5,013,978 A | * | 5/1991 | Macaulay ................... 315/367 |
| 5,473,224 A | * | 12/1995 | Tsujihara et al. ....... 315/368.18 |
| 5,512,964 A | * | 4/1996 | Kim ............................ 348/806 |
| 5,920,157 A | | 7/1999 | Shin et al. .................. 315/389 |
| 5,945,791 A | | 8/1999 | Haferl ......................... 315/371 |

FOREIGN PATENT DOCUMENTS

JP 63-281571 11/1988 ............ H04N/3/22

* cited by examiner

Primary Examiner—Thuy V. Tran
(74) Attorney, Agent, or Firm—Mills & Onello, LLP

(57) ABSTRACT

In a circuit and method of controlling the horizontal and vertical screen sizes of a cathode ray tube (CRT) monitor, the circuit includes a horizontal screen size compensation circuit, an east-west correction signal controller, a vertical screen size compensation circuit, and a vertical screen size correction signal controller. The horizontal screen size compensation circuit compares the voltage value of a horizontal screen size correction signal with the voltage value of a horizontal reference voltage to obtain first and second horizontal current signals. In response to a horizontal control signal, the horizontal screen size compensation circuit outputs a horizontal correction current signal obtained by subtracting a horizontal variable current signal from the first horizontal current signal. The vertical screen size compensation circuit compares the voltage value of a vertical screen size correction signal with the voltage value of a vertical reference voltage to obtain first and second vertical current signals. In response to a vertical control signal, the vertical screen size compensation circuit selects one of first and second vertical correction current signals and outputs the selected signal as a vertical correction current signal.

24 Claims, 7 Drawing Sheets

CIRCUIT AND METHOD OF CONTROLLING VERTICAL AND HORIZONTAL SCREEN SIZES OF CATHODE RAY TUBE MONITOR

BACKGROUND OF THE INVENTION

This application claims the priority of Korean Patent Application No. 2002-36070, filed Jun. 26, 2002, in the Korean Intellectual Property Office, the disclosure of which is incorporated herein in its entirety by reference.

1. Field of the Invention

The present invention relates to a circuit and method for controlling the vertical and horizontal sizes of a screen of a cathode ray tube (CRT) monitor, and more particularly, to a circuit for controlling the vertical and horizontal sizes of the screen of a CRT monitor in order to compensate for changes in the vertical and horizontal screen sizes of a CRT monitor due to variations in high voltage in the CRT monitor.

2. Description of the Related Art

CRT monitors are commonly receive a power supply voltage from a switched mode power supply (SMPS), which is a form of a power supply circuit.

Here, since the anode of the CRT monitor requires a high voltage, the highest voltage among power supply voltages output from the SMPS is usually stepped up by a flyback transformer (FBT) and the stepped-up voltage is applied to the anode.

However, when high voltage is generated using the FBT, if the level of the high voltage is decreased or fluctuates even slightly, the horizontal and vertical sizes of the screen of the monitor can become distorted. That is, a variation in the level of the high voltage directly affects the horizontal and vertical sizes of the screen of a monitor.

FIG. 1 is a block diagram of the internal structure of a typical CRT monitor. Referring to FIG. 1, a CRT monitor 100 includes a microcomputer (MICOM) 110, a sync processor 120, horizontal and vertical drivers 125 and 130, a video amplifier (video amp) 165, a video driver 170, an electron gun 175, vertical and horizontal deflection coils 185 and 190, a CRT 180, a deflection regulator 135, a B+ voltage generator 140, a switching power circuit 145, a high voltage regulator 150, a FBT 160, and an anode 195.

The sync processor 120 receives a vertical synchronization signal VIN and a horizontal synchronization signal HIN and generates a vertical output signal VOUT, a horizontal output signal HOUT, and an east-west correction signal EWOUT under the control of the MICOM 110.

The horizontal driver 125 controls the horizontal deflection coil 190 in response to the horizontal output signal HOUT in order to control the horizontal size of the screen of a monitor 180. The vertical driver 130 controls the vertical deflection coil 185 in response to the vertical output signal VOUT in order to control the vertical size of the screen of the monitor 180.

A color signal RGB is applied to the electron gun 175 via the video amp 165 and the video driver 170.

The deflection regulator 135 is controlled by the SMPS 145 and controls the B+ voltage generator 140 in response to the east-west correction signal EWOUT. The FBT 160 is controlled by the high voltage regulator 150 and applies high voltage to the anode 195.

The CRT monitor 100 generates a high voltage to form a magnetic tunnel and projects electrons output from the electron gun 175 through the formed magnetic tunnel to the screen. If a change in the level of the high voltage occurs due to an overload or if a characteristic change due to a high temperature occurs when the high voltage is generated, the screen becomes distorted and the quality of an image is therefore deteriorated.

The sync processor 120 performs various operations to compensate for the anticipated distortion of the screen and the degradation of the image quality. In particular, when the screen is distorted due to a decrease in the DC voltage of the generated high voltage, the sync processor 120 performs extreme high transformer (EHT) compensation to compensate for such distortion.

Generally, the horizontal size of the screen is controlled based on the DC voltage of an east-west correction signal, and the vertical size of the screen is controlled based on the gain of the vertical output signal VOUT output from the sync processor 120. EHT compensation controls the DC voltage of the east-west correction signal EWOUT and the gain of the vertical output signal VOUT.

To be more specific, the output of the high voltage regulator 150 is fed back as a DC voltage to the sync processor 120. The sync processor 120 controls the level of the DC voltage of the east-west correction signal EWOUT using the fed-back DC voltage in order to compensate for the horizontal size of the monitor screen. Also, the sync processor 120 controls the vertical output signal VOUT in order to compensate for the vertical size of the monitor screen.

The horizontal size of the monitor screen is controlled using the DC voltage component of the east-west correction signal EWOUT, which is generally used to correct the geometry of the right and left sides of the screen. That is, the alternating current (AC) component of the east-west correction signal EWOUT is used for geometry correction.

The vertical size of the monitor screen is controlled based on the gain of the vertical output signal VOUT, and the DC voltage of the vertical output signal VOUT controls screen shifting.

During EHT compensation, the horizontal size of the screen is controlled according to a horizontal screen size correction signal HEHT, and the vertical size of the screen is controlled according to a vertical screen size correction signal VEHT.

However, since a typical CRT monitor pre-determines the degree of EHT compensation to be controlled, uniform compensation is applied for a variety of CRT monitors.

FIG. 2 is a graph showing the characteristics of conventional HEHT compensation. The horizontal size correction signal HEHT in the high voltage regulator 150 does not affect the CRT monitor system when the voltage value of the horizontal size correction signal HEHT is greater than or equal to the level of a horizontal reference voltage REFEHT that is set to be a threshold voltage.

As the voltage value of the horizontal size correction signal HEHT decreases below that of the horizontal reference voltage REFEHT, the amount of current of a horizontal current signal IO needed for compensating for the horizontal size of a monitor screen increases. When the voltage value of the horizontal size correction signal HEHT is 0V, the amount of current of the horizontal current signal IO is at a maximum.

In other words, the current value of the horizontal current signal IO increases in proportion to the difference between the voltage value of the horizontal size correction signal HEHT and the voltage value of the horizontal reference voltage REFEHT. The compensation characteristics of FIG. 2 also apply to the characteristics of a vertical size correction signal VEHT.

However, as can be seen from the graph of FIG. 2, since the degree of EHT compensation (i.e., the slope of the straight line of FIG. 2) to be pre-set in a CRT monitor is fixed, uniform compensation is applied to a variety of CRT monitors. For this reason, CRT monitor manufactures are not able to apply compensation that depends on unique and specific requirements of each particular CRT unit.

SUMMARY OF THE INVENTION

The present invention provides a circuit for controlling the vertical and horizontal screen sizes of a cathode ray tube (CRT) monitor by variably adjusting the degree of extreme high transformer (EHT) compensation.

The present invention also provides a method of controlling the vertical and horizontal screen sizes of a CRT monitor by variably adjusting the degree of EHT compensation.

According to an aspect of the present invention, there is provided a circuit for controlling the horizontal and vertical sizes of a screen of a cathode ray tube (CRT) monitor, the circuit including a horizontal screen size compensation circuit, an east-west correction signal controller, a vertical screen size compensation circuit, and a vertical screen size correction signal controller.

The horizontal screen size compensation circuit compares the voltage value of a horizontal screen size correction signal with the voltage value of a horizontal reference voltage to obtain first and second horizontal current signals, and, in response to a horizontal control signal, generates a horizontal correction current signal by subtracting a horizontal variable current signal from the first horizontal current signal, and outputs the horizontal correction current signal.

The east-west correction signal controller generates an east-west direct current (DC) correction signal by combining the horizontal correction current signal with an east-west DC gain signal.

The vertical screen size compensation circuit compares the voltage value of a vertical screen size correction signal with the voltage value of a vertical reference voltage to obtain a vertical current signal, which in one embodiment, may comprise first and second vertical current signals, generates a vertical correction current signal as a function of the vertical current signal(s) and a vertical control signal, and outputs the vertical correction current signal.

The vertical screen size correction signal controller compares a sawtooth voltage signal with a sawtooth reference voltage, amplifies the difference, converts the amplified signal into a sawtooth current signal, and generates a vertical screen size control signal by subtracting the vertical correction current signal from the sawtooth current signal.

The horizontal screen size compensation circuit includes first and second comparators, a first digital-to-analog converter, a horizontal variable current signal generator, and a horizontal correction current signal generator.

The first comparator receives the horizontal reference voltage via its positive terminal and the horizontal screen size correction signal via its negative terminal and outputting the first horizontal current signal. The second comparator receives the horizontal reference voltage via its positive terminal and the horizontal screen size correction signal via its negative terminal and outputs the second horizontal current signal.

The first digital-to-analog converter receives the horizontal control signal and generates a horizontal control current signal used to generate the horizontal variable current signal. The horizontal variable current signal generator generates the horizontal variable current signal by dividing the current value of the second horizontal current signal by the current value of the horizontal control current signal.

The horizontal correction current signal generator generates the horizontal correction current signal by subtracting the current value of the horizontal variable current signal from the current value of the first horizontal current signal.

The current value of the first horizontal current signal is greater than or equal to the current value of the horizontal variable current signal. As the value of the east-west DC correction signal increases, the horizontal screen size of the CRT monitor decreases.

The horizontal correction current signal varies between the current value of the first horizontal current signal and the current value obtained by subtracting the current value of the horizontal variable current signal from the current value of the first horizontal current signal.

The horizontal screen size correction signal is a voltage signal that is generated by a high voltage regulator and fed back. The horizontal control signal is an $I^2C$ signal generated by a microcomputer.

The vertical screen size compensation circuit includes third and fourth comparators, a second digital-to-analog converter, a vertical variable current signal generator, and a first vertical correction current signal generator.

The third comparator receives the vertical reference voltage via its positive terminal and the vertical screen size correction signal via its negative terminal and outputs the first vertical current signal. The fourth comparator receives the vertical reference voltage via its positive terminal and the vertical screen size correction signal via its negative terminal and outputs the second vertical current signal.

The second digital-to-analog converter receives the vertical control signal and generates a vertical control current signal used to generate the vertical variable current signal. The vertical variable current signal generator generates the vertical variable current signal by dividing the current value of the second vertical current signal by the current value of the vertical control current signal.

The first vertical correction current signal generator generates the first vertical correction current signal by subtracting the current value of the vertical variable current signal from the current value of the first vertical current signal.

The current value of the first vertical current signal is greater than or equal to the current value of the vertical variable current signal.

The vertical screen size compensation circuit further includes a second vertical correction current signal generator and a mode selector. The second vertical correction current signal generator generates the second vertical correction current signal by adding the current value of the vertical variable current signal to the current value of the first vertical current signal. The mode selector outputs the second vertical correction current signal as the vertical correction current signal in response to an external selection signal.

As the value of the vertical screen size control signal increases, the vertical screen size of the CRT monitor increases. The vertical correction current signal varies between the current value obtained by subtracting the current value of the vertical variable current signal from the current value of the first vertical current signal and the current value obtained by adding the current value of the vertical variable current signal to the current value of the first vertical current signal, and the current value of the first vertical current signal is the middle value of the variation range.

The vertical screen size correction signal is a voltage signal that is generated by a high voltage regulator and fed back. The vertical control signal is an I²C signal (inter-integrated circuit) generated by the microcomputer.

According to another aspect of the present invention, there is provided a method of controlling the horizontal screen size of a CRT monitor, according to a first embodiment of the present invention. In the method, first, the current value of a horizontal screen size correction signal, for example, such a signal as fed back from a high voltage regulator, is compared with the current value of a horizontal reference voltage to obtain first and second horizontal current signals. Next, a digital horizontal control signal is converted into an analog horizontal control current signal. Thereafter, a horizontal variable current signal is generated by dividing the current value of the second horizontal current signal by the current value of the horizontal control current signal. Then, a horizontal correction current signal is generated by subtracting the current value of the horizontal variable current signal from the current value of the first horizontal current signal. Then, an east-west DC correction signal is generated by combining the horizontal correction current signal with an east-west DC gain signal.

The current value of the first horizontal current signal is greater than or equal to the current value of the horizontal variable current signal. As the value of the east-west DC correction signal increases, the horizontal screen size of the CRT monitor decreases.

The horizontal correction current signal varies between the current value of the first horizontal current signal and the current value obtained by subtracting the current value of the horizontal variable current signal from the current value of the first horizontal current signal.

The horizontal control signal is an I²C signal generated by a microcomputer.

According to another aspect of the present invention, there is also provided a method of controlling the vertical screen size of a CRT monitor, according to a second embodiment of the present invention. In the method, first, the current value of a vertical screen size correction signal, for example, such a signal as fed back from a high voltage regulator, is compared with the current value of a vertical reference voltage to obtain first and second vertical current signals. Next, a digital vertical control signal is converted into an analog vertical control current signal. Thereafter, a vertical variable current signal is generated by dividing the current value of the second vertical current signal by the current value of the vertical control current signal. Then, either a value obtained by subtracting the current value of the vertical variable current signal from the current value of the first vertical current signal or a value obtained by adding the current value of the vertical variable current signal to the current value of the first vertical current signal is output as a vertical correction current signal. Then, a sawtooth voltage signal is compared with a sawtooth reference voltage to determine the difference therebetween, the difference is amplified, and the amplified signal is output as a sawtooth current signal. A vertical screen size control signal is generated by subtracting the vertical correction current signal from the sawtooth current signal.

The current value of the first vertical current signal is greater than or equal to the current value of the vertical variable current signal. As the value of the vertical screen size control signal increases, the vertical screen size of the CRT monitor increases.

The vertical correction current signal varies between the current value obtained by subtracting the current value of the vertical variable current signal from the current value of the first vertical current signal and the current value obtained by adding the current value of the vertical variable current signal to the current value of the first vertical current signal, and the current value of the first vertical current signal is the middle value of the variation range.

The vertical control signal is, for example, an I²C signal generated by a microcomputer.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF PREFERRED EMBODIMENTS

Figure 1:
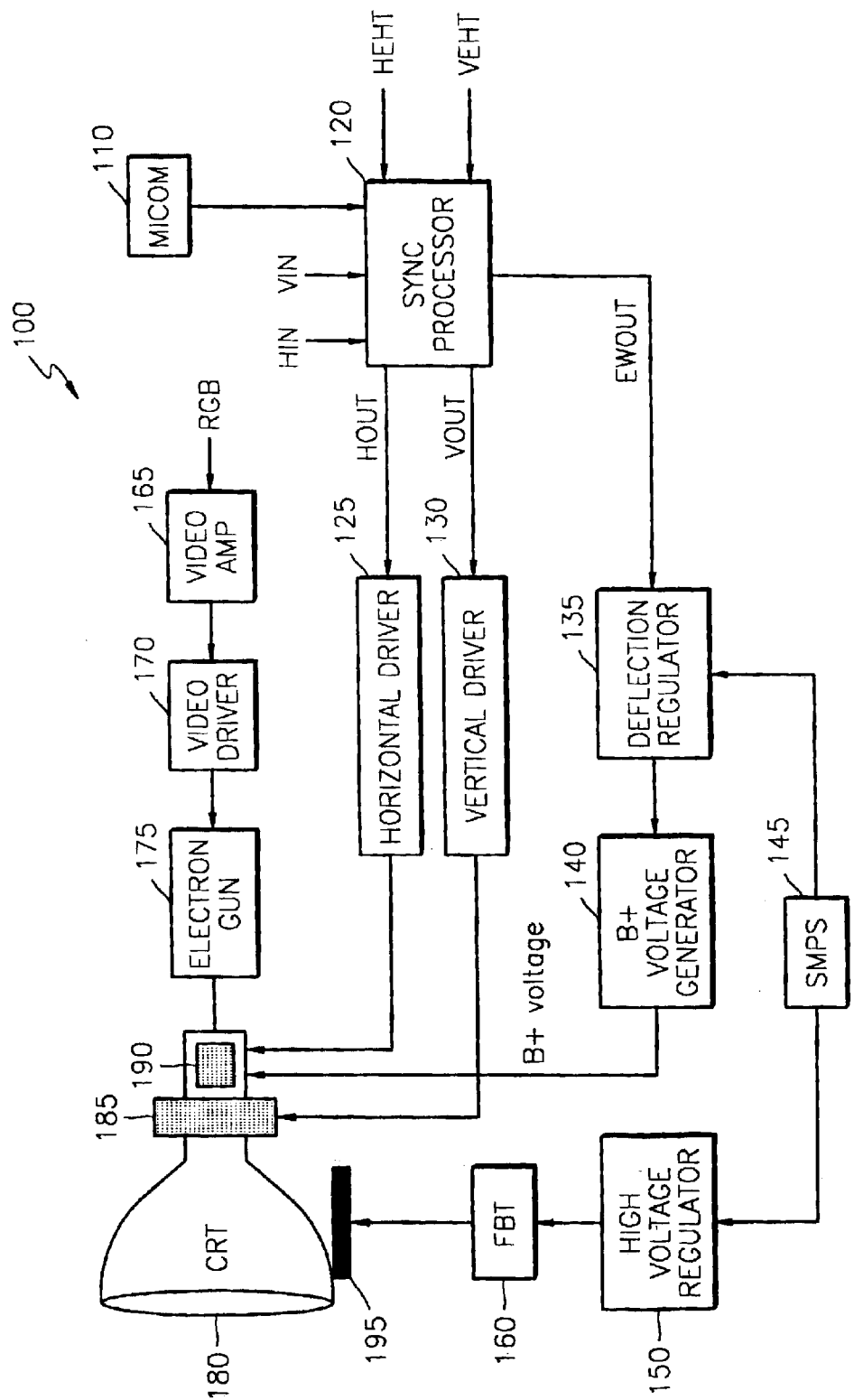
FIG. 1 is a block diagram of the internal structure of a general cathode ray tube (CRT) monitor.

The present invention will now be described more fully with reference to the accompanying drawings, in which preferred embodiments of the invention are shown. The embodiments of the present invention are provided in order to more completely explain the present invention to anyone skilled in the art. In the drawings, the same reference numerals denote the same member.

Figure 3:
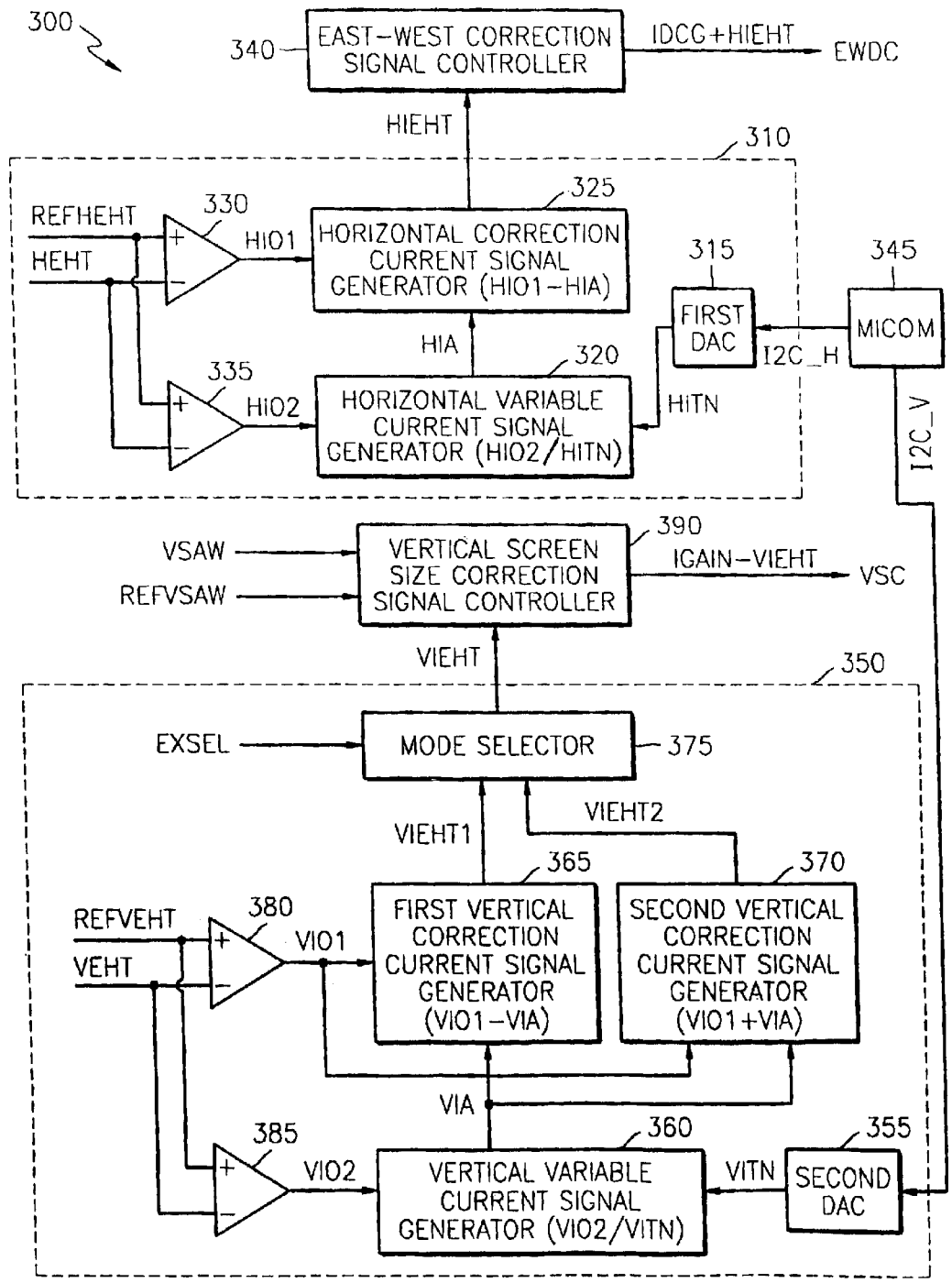
FIG. 3 is a block diagram of a circuit according to a first embodiment of the present invention, which controls the vertical and horizontal screen sizes of a CRT monitor.

FIG. 3 is a block diagram of a circuit for controlling the vertical and horizontal screen sizes of a CRT monitor according to a first embodiment of the present invention. The circuit 300 includes a horizontal screen size compensation circuit 310, an east-west correction signal controller 340, a vertical screen size compensation circuit 350, and a vertical screen size correction signal controller 390.

The horizontal screen size compensation circuit 310 compares the voltage value of a horizontal screen size correction signal HEHT with that of a horizontal reference voltage REFHEHT in order to output first and second horizontal current signals HIO1 and HIO2. In addition, the horizontal screen size compensation circuit 310 outputs as a horizontal correction current signal HIEHT a current level obtained by subtracting a horizontal variable current signal HIA from the first horizontal current signal HIO1 in response to a horizontal control signal I$^2$C_H.

To be more specific, the horizontal screen size compensation circuit 310 includes first and second comparators 330 and 335, a first digital-to-analog converter (DAC) 315, a horizontal variable current signal generator 320, and a horizontal correction current signal generator 325.

The first comparator 330 receives the horizontal reference voltage REFHEHT via a positive terminal and the horizontal screen size correction signal HEHT via a negative terminal and outputs the first horizontal current signal HIO1. The current value of the first horizontal current signal HIO1 is equal to or greater than that of the horizontal variable current signal HIA.

The horizontal screen size correction signal HEHT is a voltage signal that is generated by a high voltage regulator (not shown) and fed back, as described above with reference to FIG. 1.

The second comparator 335 receives the horizontal reference voltage REFHEHT via its positive input terminal and the horizontal screen size correction signal HEHT via its negative input terminal and outputs the second horizontal current signal HIO2.

The first DAC 315 receives a horizontal control signal I$^2$C_H to generate a horizontal control current signal HITV for generating the horizontal variable current signal HIA. The horizontal control signal I$^2$C_H is an I$^2$C signal generated by a microcomputer (MICOM) 345.

The horizontal variable current signal generator 320 generates the horizontal variable current signal HIA by dividing the current value of the second horizontal current signal HIO2 by the current value of the horizontal control current signal HITN.

The horizontal correction current signal generator 325 generates the horizontal correction current signal HIEHT by subtracting the current value of the horizontal variable current signal HIA from the current value of the first horizontal current signal HIO1. The horizontal correction current signal HIEHT varies between the current value of the first horizontal current signal HIO1 and the current value obtained by subtracting the current value of the horizontal variable current signal HIA from the current value of the first horizontal current signal HIO1.

The east-west correction signal controller 340 combines the horizontal correction current signal HIEHT with an internal east-west direct current gain signal IDCG to obtain an east-west DC correction signal EWDC. As the level of the east-west DC correction signal EWDC increases, the horizontal screen size of the CRT monitor decreases.

The vertical screen size compensation circuit 350 compares the voltage value of a vertical screen size correction signal VEHT with that of a vertical reference voltage REFVEHT to obtain first and second vertical current signals VIO1 and VIO2. In addition, the vertical screen size compensation circuit 350 outputs as a vertical correction current signal VIEHT either a first or second vertical correction current signal VIEHT1 or VIEHT2 in response to a vertical control signal I$^2$C_V.

To be more specific, the vertical screen size compensation circuit 350 includes third and fourth comparators 380 and 385, a second DAC 355, a vertical variable current signal generator 360, and a first vertical correction current signal generator 365.

The third comparator 380 receives the vertical reference voltage REFVEHT via its positive terminal and the vertical screen size correction signal VEHT via its negative terminal and outputs the first vertical current signal VIO1. The fourth comparator 385 receives the vertical reference voltage REFVEHT via its positive terminal and the vertical screen size correction signal VEHT via its negative terminal and outputs the second vertical current signal VIO2.

The current value of the first vertical current signal VIO1 is equal to or greater than that of the vertical variable current signal VIA. The vertical screen size correction signal VEHT is a voltage signal that is generated by a high voltage regulator (not shown) and fed back, as described above with reference to FIG. 1.

The second DAC 355 receives the vertical control signal I$^2$C_V and generates a vertical control current signal VITN which is used to generate the vertical variable current signal VIA. The vertical control signal I$^2$C_V is an I$^2$C signal generated by the MICOM 345.

The vertical variable current signal generator 360 generates the vertical variable current signal VIA by dividing the current value of the second vertical current signal VIO2 by the current value of the vertical control current signal VITN.

The first vertical correction current signal generator 365 generates the first vertical correction current signal VIEHT1 by subtracting the current value of the first vertical variable current signal VIA from the current value of the first vertical current signal VIO1.

The vertical screen size correction signal controller 390 obtains a sawtooth current signal IGAIN by comparing and amplifying a sawtooth reference voltage REFVSAW and a sawtooth voltage signal VSAW and generates a vertical screen size control signal VSC by subtracting the vertical correction current signal VIEHT from the sawtooth current signal IGAIN. As the level of the vertical screen size control signal VSC increases, the vertical screen size of the CRT monitor decreases.

The vertical screen size compensation circuit 350 further includes a second vertical correction current signal generator 370 and a mode selector 375. The second vertical correction current signal generator 370 generates the second vertical correction current signal VIEHT2 by summing the current value of the first vertical current signal VIO1 and the current value of the vertical variable current signal VIA. The mode selector 375 outputs a second vertical correction current signal VIEHT2 as the vertical correction current signal VIEHT in response to an external selection signal EXSEL.

The vertical correction current signal VIEHT varies between a current value obtained by subtracting the vertical variable current signal VIA from the first vertical current signal VIO1 and a current value obtained by adding the vertical variable current signal VIA to the first vertical current signal VIO1. The current value of the first vertical current signal VIO1 is the middle value of the above variation range.

Figure 6:
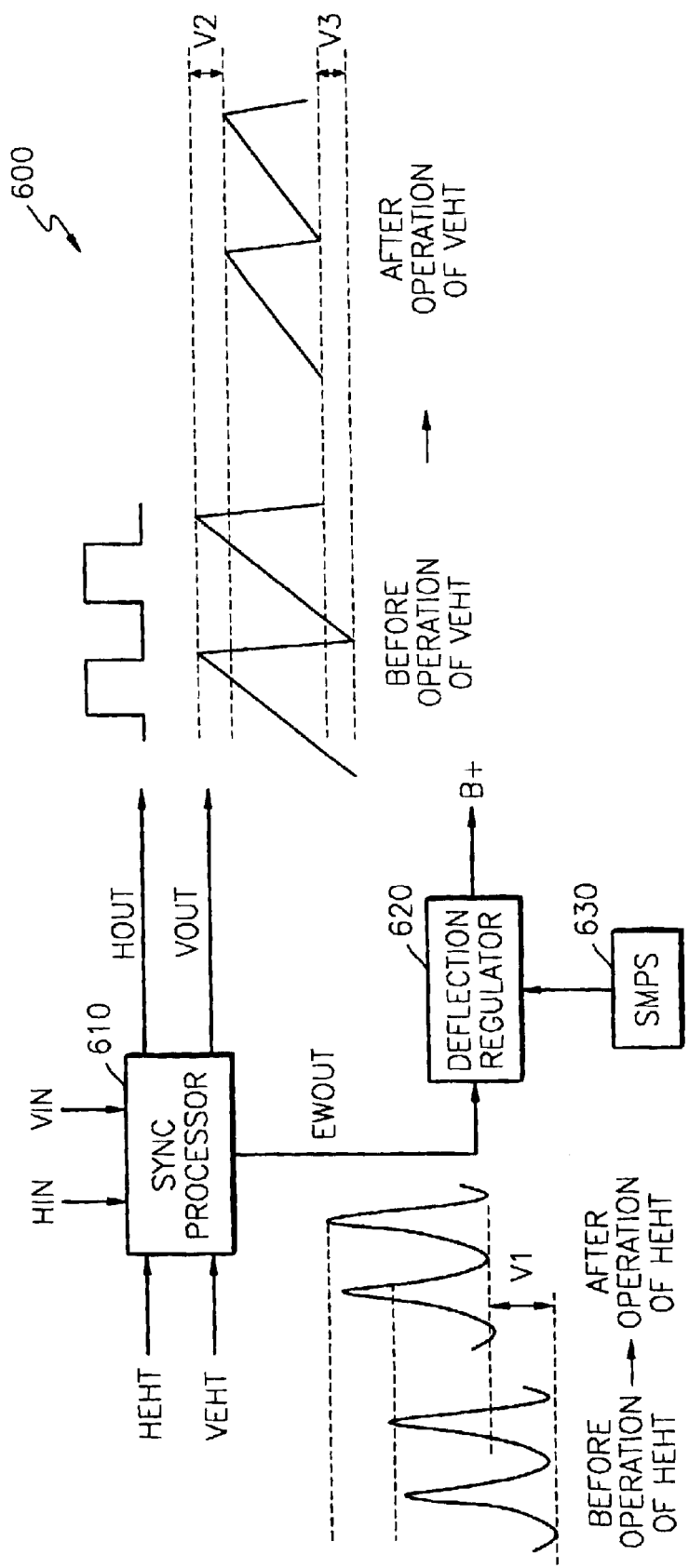
FIG. 6 illustrates the waveforms of an east-west direct current (DC) correction signal and a vertical screen size control signal, which are for controlling the horizontal and vertical screen sizes of a monitor.

FIG. 6 illustrates the waveforms of an east-west DC correction signal and a vertical screen size control signal, which are used to control the horizontal and vertical screen sizes of a monitor. FIG. 6 will be described in detail below.

Figure 7:
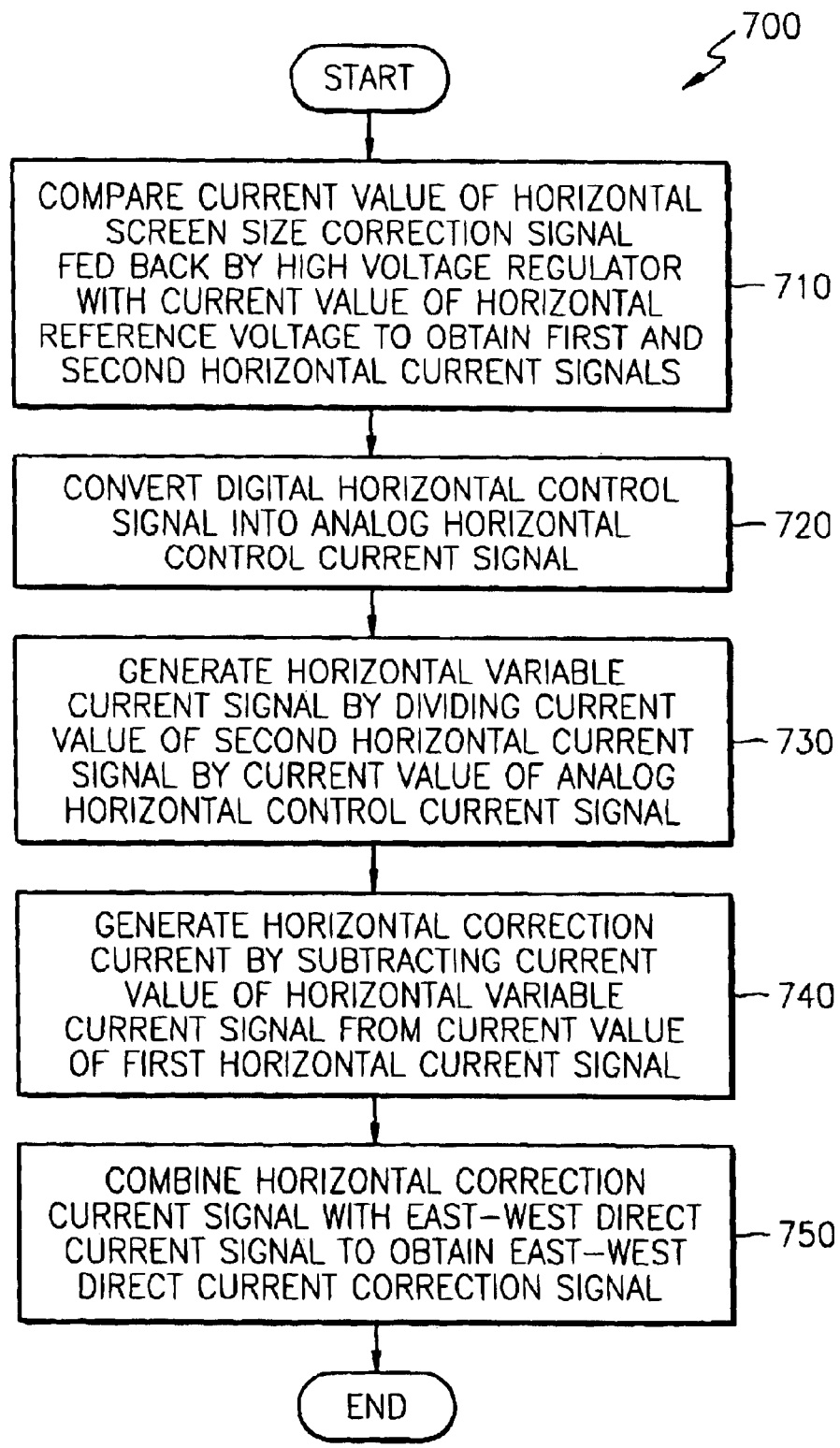
FIG. 7 is a flow diagram illustrating a method of controlling the horizontal screen size of a CRT monitor according to a first embodiment of the present invention.

FIG. 7 is a flowchart illustrating a method according to a first embodiment of the present invention, of controlling the horizontal screen size of a CRT monitor. Referring to FIG. 7, the method 700 includes steps 710 through 750. In step 710, the current value of a horizontal screen size correction signal fed back by a high voltage regulator is compared with the current value of a horizontal reference voltage to obtain first and second horizontal current signals. In step 720, a digital horizontal control signal is converted into an analog horizontal control current signal. In step 730, a horizontal variable current signal is generated by dividing the current value of the second horizontal current signal by the current value of the analog horizontal control current signal. In step 740, a horizontal correction current signal is generated by subtracting the current value of the horizontal variable current signal from the current value of the first horizontal current signal. In step 750, the horizontal correction current signal is combined with an east-west DC gain signal to obtain an east-west DC correction signal.

Figure 8:
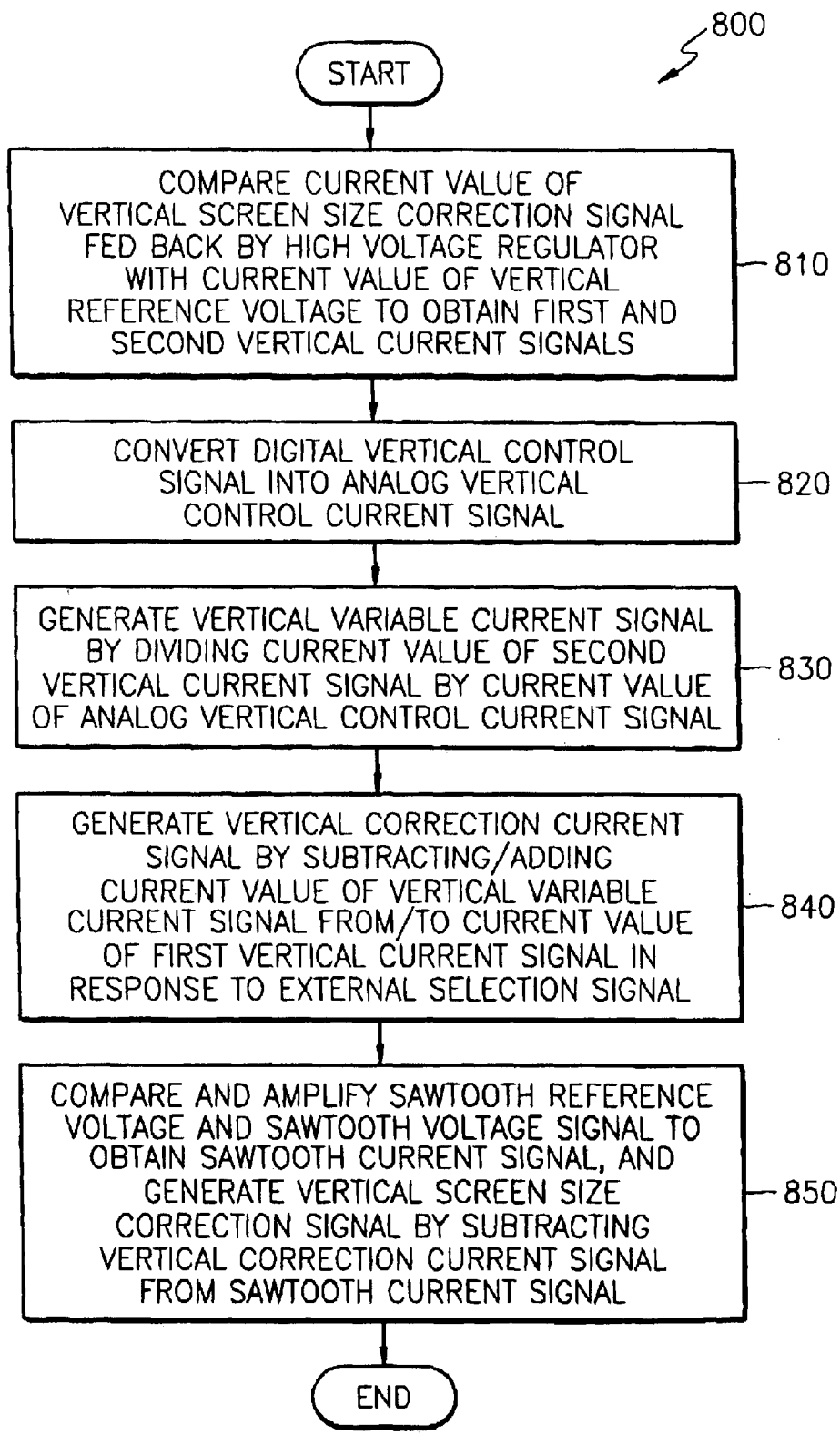
FIG. 8 is a flow diagram illustrating a method of controlling the horizontal screen size of a CRT monitor according to a second embodiment of the present invention.

FIG. 8 is a flowchart illustrating a method according to a second embodiment of the present invention, of controlling the vertical screen size of a CRT monitor. Referring to FIG. 8, the method 800 includes steps 810 through 850. In step 810, the current value of a vertical screen size correction signal fed back by a high voltage regulator is compared with the current value of a vertical reference voltage to obtain first and second vertical current signals. In step 820, a digital vertical control signal is converted into an analog vertical control current signal. In step 830, a vertical variable current signal is generated by dividing the current value of the second vertical current signal by the current value of the analog vertical control current signal. In step 840, a vertical correction current signal is generated by subtracting/adding the current value of the vertical variable current signal from/to the current value of the first vertical current signal. In step 850, a sawtooth reference voltage and a sawtooth voltage signal are compared and amplified to obtain a sawtooth current signal, and a vertical screen size correction signal is generated by subtracting the vertical correction current signal from the sawtooth current signal.

Hereinafter, the operation of the circuit for controlling the horizontal and vertical screen sizes of a CRT monitor according to the present invention and the methods of controlling the horizontal and vertical screen sizes of the CRT monitor will be described in greater detail with reference to FIGS. 3 through 8.

First, the current value of the horizontal screen size correction signal HEHT fed back by a high voltage regulator is compared with that of the horizontal reference voltage REFHEHT to obtain first and second horizontal current signals HIO1 and HIO2, in step 710.

The first and second comparators 330 and 335 in the horizontal screen size compensation circuit 310 each receive the horizontal reference voltage REFHEHT via their positive terminals and the horizontal screen size correction signal HEHT via their negative terminals and output the first and second horizontal current signals HIO1 and HIO2, respectively. The first and second horizontal current signals HIO1 and HIO2 are the same.

The horizontal screen size correction signal HEHT is a voltage signal that is generated by a high voltage regulator (not shown) and fed back. The high voltage regulator applies high voltage to the anode of a monitor. The high voltage is fed back and compared with the horizontal reference voltage REFHEHT.

The voltage value of the horizontal screen size correction signal HEHT is compared with that of the horizontal reference voltage REFHEHT. The difference between the voltage values of the two signals is output as a current signal, amplified in the first comparator 330, and applied to the east-west correction signal controller 340.

The east-west correction signal controller 340 combines the current signal corresponding to the difference between the voltage values of the horizontal screen size correction signal HEHT and the horizontal reference voltage REFHEHT with an east-west DC gain signal to obtain the east-west DC correction signal EWDC for controlling the horizontal screen size of a monitor.

In the conventional approach, the level of a current signal obtained based on the difference between the voltage value of the horizontal screen size correction signal HEHT and that of the horizontal reference voltage REFHEHT has a predetermined slope value that does not change. However, in the present invention, the level of a current signal obtained based on the difference between the voltage value of the horizontal screen size correction signal HEHT and that of the horizontal reference voltage REFHEHT has an slope value that is variably controlled.

A CRT monitor designer determines whether the horizontal screen size of a screen is to be enlarged or reduced and applies information regarding the enlargement or reduction of the horizontal size of the screen to the MICOM 345. The MICOM 345 generates the horizontal control signal $I^2C\_H$ in response to the received information.

Figure 4:
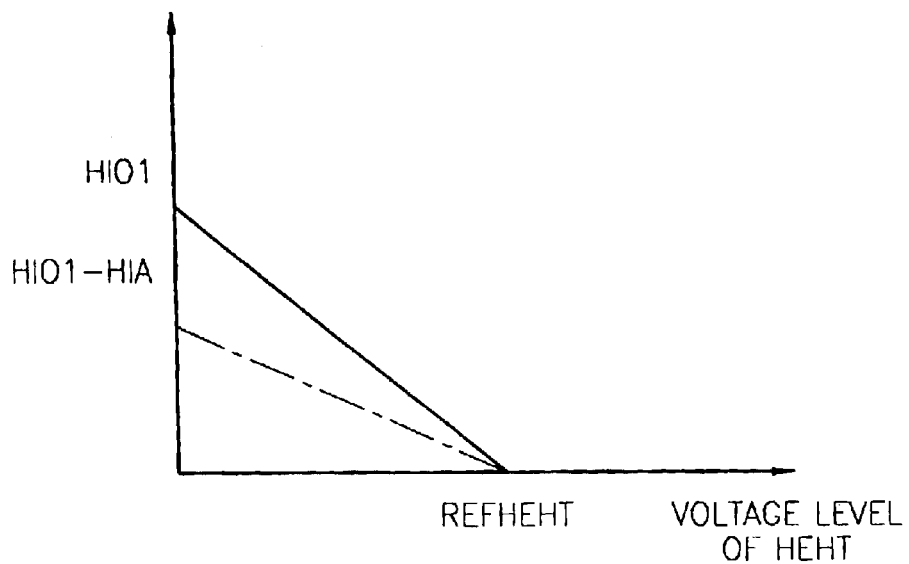
FIG. 4 is a graph showing the relationship between the horizontal screen size correction signal and the horizontal correction current signal of FIG. 3.
Figure 5:
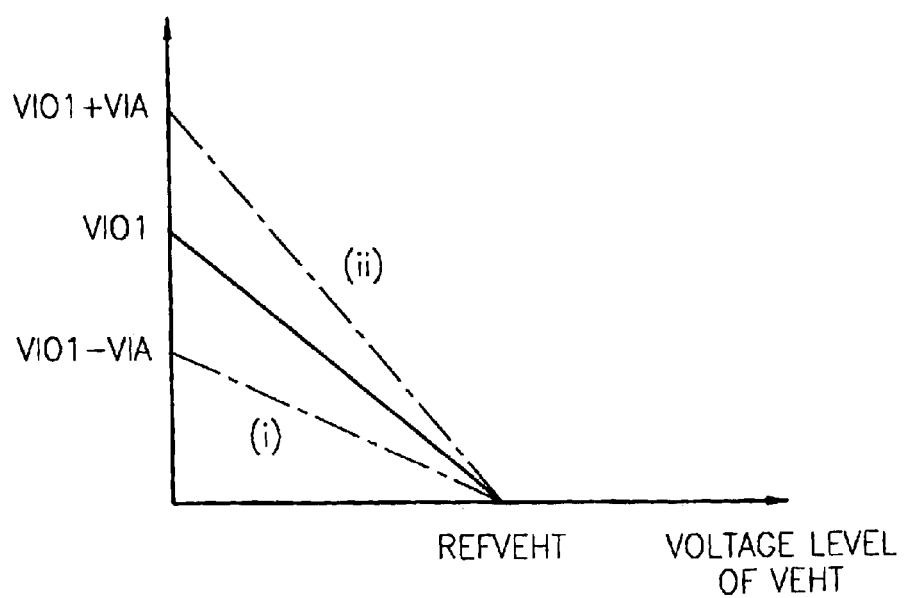
FIG. 5 is a graph showing the relationship between the vertical screen size correction signal and the vertical correction current signal of FIG. 3.

The horizontal control signal $I^2C\_H$ includes information that is used to select the degree of reduction of the horizontal size of a screen. That is, the horizontal control signal $I^2C\_H$ has information used to determine the inclination of the horizontal correction current signal HIEHT as shown in the graph of FIG. 4. The horizontal control signal $I^2C\_H$ is produced from a digital $I^2C$ signal, which is generally used in CRT monitors.

In step 720, the digital horizontal control signal $I^2C\_H$ is converted into the analog horizontal control current signal HITN. The first DAC 315 receives the horizontal control signal $I^2C\_H$ and generates the horizontal control current signal HITN, which is used to generate the horizontal variable current signal HIA.

In step 730, the horizontal variable current signal generator 320 generates the horizontal variable current signal HIA by dividing the current value of the second horizontal current signal HIO2 by that of the horizontal control current signal HITN. The current value of the horizontal control current signal HITN is smaller than that of the second horizontal current signal HIO2. The horizontal variable current signal HIA therefore has a positive level.

In step 740, the horizontal correction current signal generator 325 generates the horizontal correction current signal HIEHT by subtracting the current value of the horizontal variable current signal HIA from the current value of the first horizontal current signal HIO1. The current value of the first horizontal current signal HIO1 is greater than or equal to that of the horizontal variable current signal HIA.

Accordingly, the horizontal correction current signal HIEHT varies between the current value of the first horizontal current signal HIO1 and the current value obtained by subtracting the current value of the horizontal variable current signal HIA from the current value of the first horizontal current signal HIO1.

In step 750, the east-west correction signal controller 340 combines the horizontal correction current signal HIEHT with the east-west DC gain signal IDCG to obtain the east-west DC correction signal EWDC. Hence, the east-west DC correction signal EWDC varies in accordance with variations in the current value of the horizontal correction current signal HIEHT.

As the value of the east-west DC correction signal EWDC increases, the horizontal screen size of a CRT monitor decreases. That is, the horizontal screen size of the CRT monitor can be reduced by increasing the current value of the horizontal correction current signal HIEHT.

The current value of the horizontal correction current signal HIEHT can be increased by reducing the current value of the horizontal variable current signal HIA. The current value of the horizontal variable current signal HIA can be reduced by increasing the current value of the horizontal control current signal HITN.

In this manner, the digital value of the horizontal control signal I$^2$C_H generated by the MICOM 345 is controlled, so that the horizontal screen size of the CRT monitor is controlled. The digital value of the horizontal control signal I$^2$C_H is set by controlling the MICOM 345. Control over the MICOM 345 is made by a CRT monitor designer.

The east-west DC correction signal EWDC is applied to a current-to-voltage converter (not shown) and transformed into a voltage. The east-west DC correction signal EWDC transformed into a voltage controls the B+ voltage of FIG. 1. The B+ voltage controls a horizontal driver (not shown) of the monitor in order to control the horizontal size of the monitor screen.

In step 810, the current value of the vertical screen size correction signal VEHT fed back from a high voltage regulator is compared to that of the vertical reference voltage REFVEHT to obtain the first and second vertical current signals VIO1 and VIO2.

To be more specific, the third and fourth comparators 380 and 385 of the vertical screen size compensation circuit 350 receive the vertical reference voltage REFVEHT via their positive terminals and the vertical screen size correction signal VEHT via their negative terminals and output the first and second vertical current signals VIO1 and VIO2, respectively. The first and second vertical current signals VIO1 and VIO2 are identical.

The vertical screen size correction signal VEHT is generated by a high voltage regulator (not shown) and fed back.

That is, the voltage value of the vertical screen size correction signal VEHT is compared with that of the vertical reference voltage REFVEHT, and the difference is amplified and applied to the vertical screen size correction signal controller 390.

The vertical screen size correction signal controller 390 compares the sawtooth reference voltage REFVSAW to the sawtooth voltage signal VSAW and amplifies the difference to obtain the sawtooth current signal IGAIN.

The sawtooth voltage signal VSAW is generated from a vertical synchronization signal (not shown) that is subject to a predetermined process within the monitor. The vertical screen size correction signal controller 390 performs the function of amplifying the difference between the sawtooth reference voltage REFVSAW and the sawtooth voltage signal VSAW and also the function of transforming voltage to current.

The vertical screen size control signal VSC for controlling the vertical screen size of the monitor is generated by subtracting the vertical correction current signal VIEHT from the sawtooth current signal IGAIN. As the value of the vertical screen size control signal VSC increases, the vertical screen size of the CRT monitor is increased.

In the conventional approach, the level of the current signal obtained based on the difference between the voltage value of the vertical screen size correction signal VEHT and that of the vertical reference voltage REFVEHT has a predetermined inclination, or slope, that does not change. However, in the present invention, the level of a current signal obtained based on the difference between the voltage value of the vertical screen size correction signal VEHT and that of the vertical reference voltage REFVEHT has a slope that is variably controlled.

A CRT monitor designer determines whether to increase or decrease the vertical size of a screen and applies information regarding an increase or decrease in the vertical size of the screen to the MICOM 345. The MICOM 345 generates the vertical control signal I$^2$C_V in response to the applied information.

The vertical control signal I$^2$C_V includes information that is used to select the degree to which the vertical size of the screen is reduced. That is, the vertical control signal I$^2$C_V includes information that is used to determine the inclination of the vertical correction current signal VIEHT of FIG. 5. The vertical control signal I$^2$C_V is produced from an I$^2$C signal, which is generally used in CRT monitors. The I$^2$C signal is a digital signal.

In step 820, the digital vertical control signal I$^2$C_V is converted into the analog vertical control current signal VITN.

The second DAC 355 receives the vertical control signal I$^2$C_V and generates the vertical control current signal VITN, which is used to generate the vertical variable current signal VIA. The vertical control current signal VITN is an analog signal that is converted from the digital vertical control signal I$^2$C_V.

In step 830, the vertical variable current signal generator 360 generates as the vertical variable current signal VIA a value obtained by dividing the current value of the second vertical current signal VIO2 by the current value of the vertical control current signal VITN. The current value of the vertical control current signal VITN is smaller than that of the second vertical current signal VIO2. The vertical variable current signal VIA has a positive value.

In step 840, the vertical correction current signal VIEHT is obtained by selecting either a value obtained by subtracting the current value of the vertical variable current signal VIA from the current value of the first vertical current signal VIO1 or a value obtained by adding the current value of the vertical variable current signal VIA to the current value of the first vertical current signal VIO1 in response to the external selection signal EXSEL.

Finally, in step 850, the difference between the sawtooth reference voltage REFVSAW and the sawtooth voltage signal VSAW is amplified to obtain the sawtooth current signal IGAIN, and the vertical screen size control signal VSC is generated by subtracting the vertical correction current signal VIEHT from the sawtooth current signal IGAIN.

The first vertical correction current signal generator 365 generates the first vertical correction current signal VIEHT1 by subtracting the current value of the vertical variable current signal VIA from the current value of the first vertical current signal VIO1. The first vertical correction current signal VIEHT1 is selected and applied as the vertical correction current signal VIEHT to the vertical screen size correction signal controller 390.

Since the current value of the first vertical current signal VIO1 is greater than or equal to that of the vertical variable current signal VIA, the first vertical correction current signal VIEHT1 varies between the current value of the first vertical current signal VIO1 and a current value obtained by subtracting the current value of the vertical variable current signal VIA from the current value of the first vertical current signal VIO1. This is indicated by the inclination (i) of FIG. 5.

Figure 2:
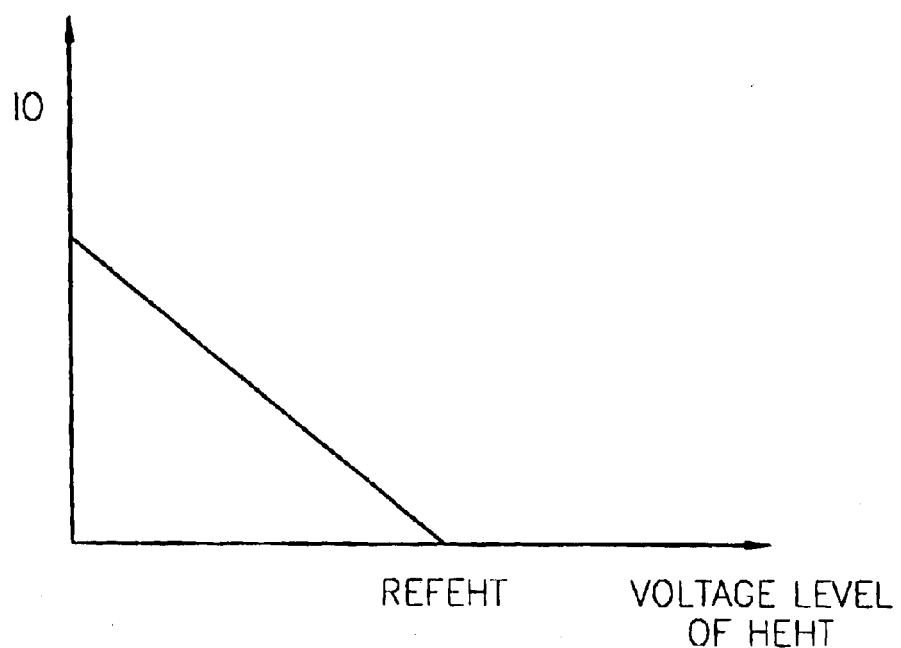
FIG. 2 is a graph that illustrates the characteristics of conventional horizontal size correction signal (HEHT) compensation.

In the conventional approach, the first vertical current signal VIO1 is directly applied to the vertical screen size correction signal controller 390, which generates the vertical screen size control signal VSC for controlling the vertical screen size of a monitor. The first vertical current signal VIO1 has a fixed level with a fixed inclination to compensate for the vertical screen size of a monitor as shown in FIG. 2. Hence, it is difficult for monitor designers to design monitors with various vertical screen sizes.

However, in the present invention, the first vertical current signal VIO1 is transformed into the first vertical correction current signal VIEHT1 having a variety of inclinations before the first vertical current signal VIO1 is applied to the vertical screen size correction signal controller 390.

When the vertical screen size of a monitor is required to decrease, a value obtained by subtracting the vertical variable current signal VIA from the first vertical current signal VIO1 is used as the first vertical correction current signal VIEHT1, which is applied as the vertical correction current signal VIEHT to the vertical screen size correction signal controller 390. The vertical screen size correction signal controller 390 generates as the vertical screen size control signal VSC a value obtained by subtracting the vertical correction current signal VIEHT from the sawtooth current signal IGAIN.

In other words, the vertical screen size of a monitor is controlled by adjusting the gain of the vertical screen size control signal VSC. The vertical screen size control signal VSC is applied to a current-to-voltage converter (not shown) and converted into a voltage. The vertical screen size control signal VSC converted into a voltage is applied to the vertical driver 130 of FIG. 1 in order to control the vertical size of the monitor screen.

The vertical screen size compensation circuit 350 can further include the second vertical correction current signal generator 370 and the mode selector 375. The second vertical correction current signal generator 370 is used to increase the vertical screen size of a monitor.

The second vertical correction current signal generator 370 generates the second vertical correction current signal by adding the current value of the vertical variable current signal VIA to the current value of the first vertical current signal VIO1.

The second vertical correction current signal VIEHT2 varies between the current value of the first vertical current signal VIO1 and a current value obtained by adding the current value of the vertical variable current signal VIA to the current value of the first vertical current signal VIO1. This is indicated by the inclination (ii) of FIG. 5.

When the vertical screen size of the monitor is required to increase, the value obtained by adding the vertical variable current signal VIA to the first vertical current signal VIO1 is used as the second vertical correction current signal VIEHT2, which is applied to the mode selector 375.

The mode selector 375 outputs the second vertical correction current signal VIEHT2 as the vertical correction current signal VIEHT in response to the external selection signal EXSEL. The external selection signal EXSEL is applied by a monitor designer to the mode selector 375 when the vertical size of the monitor screen needs to be increased. Alternatively, the external selection signal EXSEL may be generated by the MICOM 345.

When the external selection signal EXSEL is applied to the mode selector 375, the mode selector 375 blocks the first vertical correction current signal VIEHT1 and outputs the second vertical correction current signal VIEHT2 as the vertical correction current signal VIEHT.

The vertical correction current signal VIEHT varies between the current value obtained by subtracting the current value of the vertical variable current signal VIA from that of the first vertical current signal VIO1 and the current value obtained by adding the current value of the vertical variable current signal VIA to the current value of the first vertical current signal VIO1. The current value of the first vertical current signal VIO1 is the middle value of the above variation range.

In order to reduce the vertical size of the monitor screen, the vertical correction current signal VIEHT is of a current value that exists between the current value of the first vertical current signal VIO1 and the current value obtained by subtracting the current value of the vertical variable current signal VIA from that of the first vertical current signal VIO1.

In order to increase the vertical size of the monitor screen, the vertical correction current signal VIEHT is of a current value that exists between the current value of the first vertical current signal VIO1 and the current value obtained by adding the current value of the vertical variable current signal VIA to that of the first vertical current signal VIO1.

A monitor designer, during the design of the monitor, determines whether to increase or decrease the vertical size of the monitor screen. In order to decrease the vertical size of the monitor screen, the monitor designer applies information for decreasing the vertical size of the monitor screen to the MICOM 345. In order to increase the vertical size of the monitor screen, the monitor designer applies information for increasing the vertical size of the monitor screen to the MICOM 345.

Thereafter, in response to the applied information, the MICOM 345 generates the vertical control signal $I^2C\_V$ and controls the inclination of the vertical correction current signal VIEHT. The vertical and horizontal screen size control circuit 300 of FIG. 3 is, for example, located within the sync processor 120 of FIG. 1.

FIG. 6 illustrates the waveforms of an east-west DC correction signal and a vertical screen size control signal, which are both used to control the horizontal and vertical screen sizes of a monitor.

In order to control the horizontal size of the monitor screen, the east-west DC correction signal EWDC is output as the east-west correction signal EWOUT after undergoing a predetermined process. The horizontal size of the monitor screen is controlled by controlling the DC voltage of the east-west correction signal EWOUT.

The amount of increment of the horizontal correction current signal HIEHT of FIG. 3 is equal to V1 of FIG. 6. That is, it can be seen from FIG. 6 that the DC voltage value of the east-west correction signal EWOUT has been increased by an amount of voltage V1 after compensation of the horizontal screen size.

In order to control the vertical size of the monitor screen, the vertical screen size control signal VSC is output as the vertical output signal VOUT after undergoing a predetermined process. The vertical size of the monitor screen is controlled by controlling the voltage gain of the vertical output signal VOUT of the sync processor 610.

The amount of variation of the vertical correction current signal VIEHT of FIG. 3 is equal to the sum of V2 and V3 of FIG. 6. That is, it can be seen from FIG. 6 that the voltage value of the vertical output signal VOUT has been decreased by V2+V3 compensation of the vertical screen size.

As described above, in the circuit and method of controlling the vertical and horizontal screen sizes of a CRT monitor, according to the present invention, the distortion of the vertical and horizontal screen sizes of the CRT monitor can be adaptively compensated for using an I²C signal, which is generally used in a monitor circuit. Since the vertical and horizontal screen sizes of the monitor can be adaptively controlled, monitor designers can accommodate the design of a variety of monitors.

While the present invention has been particularly shown and described with reference to preferred embodiments thereof, it will be understood by those of ordinary skill in the art that various changes in form and details may be made herein without departing from the spirit and scope of the present invention as defined by the following claims.

What is claimed is:

1. A circuit for controlling horizontal and vertical sizes of a screen of a cathode ray tube (CRT) monitor, the circuit comprising:

a horizontal screen size compensation circuit which compares a voltage value of a horizontal screen size correction signal with a voltage value of a horizontal reference voltage to obtain first and second horizontal current signals and, in response to a horizontal control signal, generates a horizontal correction current signal by subtracting a horizontal variable current signal from the first horizontal current signal, and outputs the horizontal correction current signal;

an east-west correction signal controller which generates an east-west direct current (DC) correction signal by combining the horizontal correction current signal with an east-west DC gain signal;

a vertical screen size compensation circuit which compares a voltage value of a vertical screen size correction signal with a voltage value of a vertical reference voltage to obtain a vertical current signal, generates a vertical correction current signal as a function of the vertical current signal and a vertical control signal, and outputs the vertical correction current signal; and a vertical screen size correction signal controller which compares a sawtooth voltage signal with a sawtooth reference voltage, amplifies a difference between the sawtooth voltage signal and the sawtooth reference signal, converts the amplified signal into a sawtooth current signal, and generates a vertical screen size control signal by subtracting the vertical correction current signal from the sawtooth current signal.

2. The circuit of claim 1, wherein the horizontal screen size compensation circuit comprises:

a first comparator which receives the horizontal reference voltage via its positive terminal and the horizontal screen size correction signal via its negative terminal and outputs the first horizontal current signal;

a second comparator which receives the horizontal reference voltage via its positive terminal and the horizontal screen size correction signal via its negative terminal and outputs the second horizontal current signal;

a first digital-to-analog converter which receives the horizontal control signal and generates a horizontal control current signal used to generate the horizontal variable current signal;

a horizontal variable current signal generator which generates the horizontal variable current signal by dividing the current value of the second horizontal current signal by the current value of the horizontal control current signal; and a horizontal correction current signal generator which generates the horizontal correction current signal by subtracting the current value of the horizontal variable current signal from the current value of the first horizontal current signal.

3. The circuit of claim 2, wherein the current value of the first horizontal current signal is greater than or equal to the current value of the horizontal variable current signal.

4. The circuit of claim 1, wherein as the value of the east-west DC correction signal increases, the horizontal screen size of the CRT monitor decreases.

5. The circuit of claim 1, wherein the horizontal correction current signal varies between the current value of the first horizontal current signal and the current value obtained by subtracting the current value of the horizontal variable current signal from the current value of the first horizontal current signal.

6. The circuit of claim 1, wherein the horizontal screen size correction signal is a voltage signal that is generated by a high voltage regulator.

7. The circuit of claim 1, wherein the horizontal control signal is an I²C signal generated by a microcomputer.

8. The circuit of claim 1, wherein the vertical current signal comprises first and second vertical current signals, and wherein the vertical correction signal comprises first and second vertical correction signals, and wherein the vertical screen size compensation circuit comprises:

a third comparator which receives the vertical reference voltage via its positive terminal and the vertical screen size correction signal via its negative terminal and outputs the first vertical current signal;

a fourth comparator that receives the vertical reference voltage via its positive terminal and the vertical screen size correction signal via its negative terminal and outputs the second vertical current signal;

a second digital-to-analog converter which receives the vertical control signal and generates a vertical control current signal used to generate a vertical variable current signal;

a vertical variable current signal generator which generates the vertical variable current signal by dividing the current value of the second vertical current signal by the current value of the vertical control current signal; and a first vertical correction current signal generator which generates the first vertical correction current signal by subtracting the current value of the vertical variable current signal from the current value of the first vertical current signal.

9. The circuit of claim 8, wherein the current value of the first vertical current signal is greater than or equal to the current value of the vertical variable current signal.

10. The circuit of claim 8, wherein the vertical screen size compensation circuit further comprises:

a second vertical correction current signal generator which generates a second vertical correction current signal by adding the current value of the vertical variable current signal to the current value of the first vertical current signal; and a mode selector which outputs the second vertical correction current signal as the vertical correction current signal in response to an external selection signal.

11. The circuit of claim 8, wherein the vertical correction current signal varies between the current value obtained by subtracting the current value of the vertical variable current signal from the current value of the first vertical current signal and the current value obtained by adding the current value of the vertical variable current signal to the current value of the first vertical current signal, and the current value of the first vertical current signal is a middle value of the variation range.

12. The circuit of claim 1, wherein, as the value of the vertical screen size control signal increases, the vertical screen size of the CRT monitor increases.

13. The circuit of claim 1, wherein the vertical screen size correction signal is a voltage signal that is generated by a high voltage regulator.

14. The circuit of claim 1, wherein the vertical control signal is an I²C signal generated by the microcomputer.

15. A method of controlling a horizontal screen size of a CRT monitor, the method comprising:
   (a) comparing a current value of a horizontal screen size correction signal with a current value of a horizontal reference voltage to obtain first and second horizontal current signals;
   (b) converting a digital horizontal control signal into an analog horizontal control current signal;
   (c) generating a horizontal variable current signal by dividing the current value of the second horizontal current signal by the current value of the analog horizontal control current signal;
   (d) generating a horizontal correction current signal by subtracting the current value of the horizontal variable current signal from the current value of the first horizontal current signal; and
   (e) generating an east-west DC correction signal by combining the horizontal correction current signal with an east-west DC gain signal.

16. The method of claim 15, wherein the current value of the first horizontal current signal is greater than or equal to the current value of the horizontal variable current signal.

17. The method of claim 15, wherein as the current value of the east-west DC correction signal increases, the horizontal screen size of the CRT monitor decreases.

18. The method of claim 15, wherein the horizontal correction current signal varies between the current value of the first horizontal current signal and the current value obtained by subtracting the current value of the horizontal variable current signal from the current value of the first horizontal current signal.

19. The method of claim 15, wherein the digital horizontal control signal is an I²C signal generated by a microcomputer.

20. A method of controlling a vertical screen size of a CRT monitor, the method comprising:
   (a) comparing a current value of a vertical screen size correction signal with a current value of a vertical reference voltage to obtain first and second vertical current signals;
   (b) converting a digital vertical control signal into an analog vertical control current signal;
   (c) generating a vertical variable current signal by dividing the current value of the second vertical current signal by the current value of the analog vertical control current signal;
   (d) selecting one of a value obtained by subtracting the current value of the vertical variable current signal from the current value of the first vertical current signal and a value obtained by adding the current value of the vertical variable current signal to the current value of the first vertical current signal, and outputting the selected signal as a vertical correction current signal; and
   (e) comparing a sawtooth voltage signal with a sawtooth reference voltage to determine a; and difference therebetween, amplifying the difference, outputting the amplified signal as a sawtooth current signal, and generating a vertical screen size control signal by subtracting the vertical correction current signal from the sawtooth current signal.

21. The method of claim 20, wherein the current value of the first vertical current signal is greater than or equal to the current value of the vertical variable current signal.

22. The method of claim 20, wherein, as the value of the vertical screen size control signal increases, the vertical screen size of the CRT monitor increases.

23. The method of claim 20, wherein the vertical correction current signal varies between the current value obtained by subtracting the current value of the vertical variable current signal from the current value of the first vertical current signal and the current value obtained by adding the current value of the vertical variable current signal to the current value of the first vertical current signal, and the current value of the first vertical current signal is a middle value of the variation range.

24. The method of claim 20, wherein the vertical control signal is an I²C signal generated by a microcomputer.

* * * * *

UNITED STATES PATENT AND TRADEMARK OFFICE
CERTIFICATE OF CORRECTION

PATENT NO.    : 6,831,415 B2
DATED         : December 14, 2004
INVENTOR(S)   : Jae-hun Lee It is certified that error appears in the above-identified patent and that said Letters Patent is hereby corrected as shown below:

Column 15,
Lines 41-42, delete "sawtooth reference signal" and insert -- sawtooth reference voltage --.

Column 18,
Line 22, delete "; and".

Signed and Sealed this

Twenty-sixth Day of April, 2005

JON W. DUDAS
*Director of the United States Patent and Trademark Office*